K. LITTLEJOHN.
ODOMETER.
APPLICATION FILED MAY 23, 1911.
1,003,623.
Patented Sept. 19, 1911.
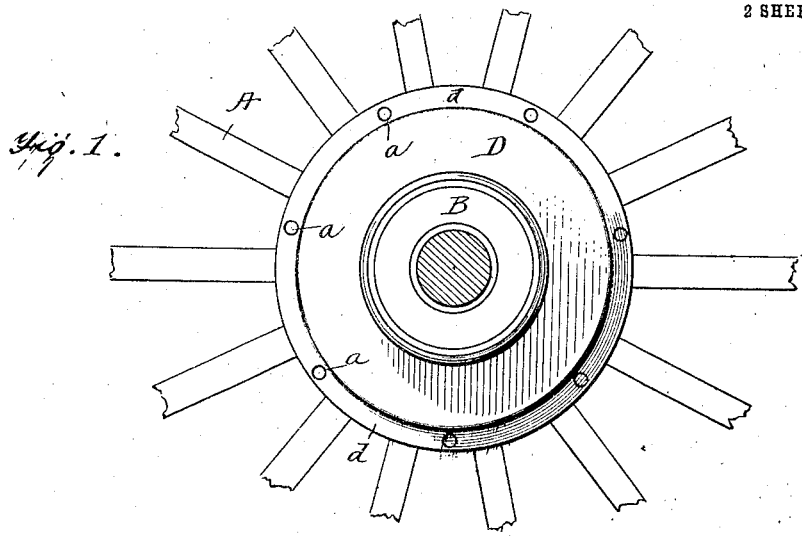
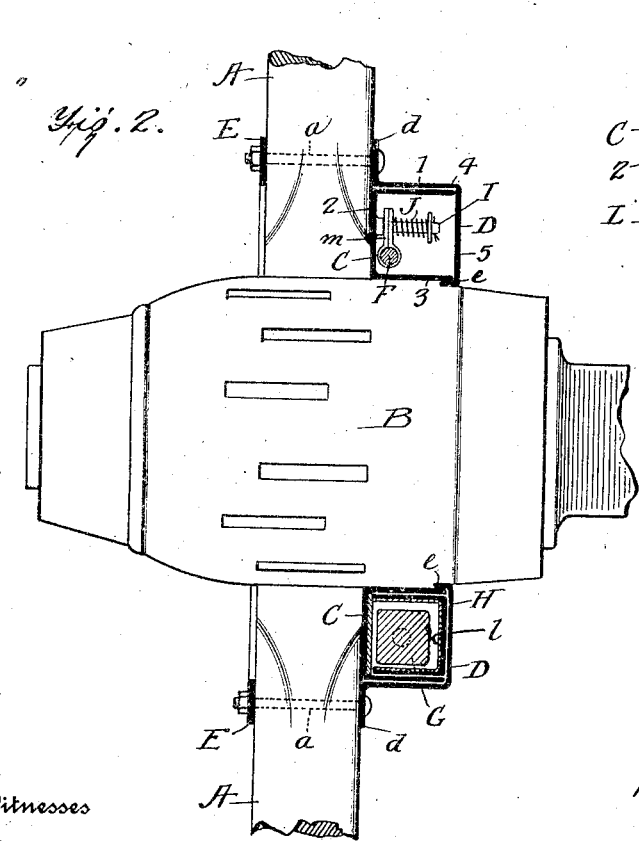
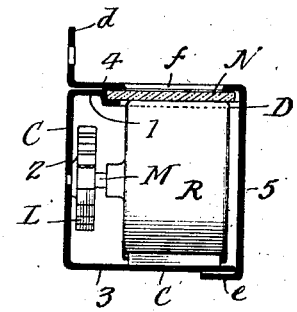
Inventor
KENDREE LITTLEJOHN,
By Edw. W. Byrn
Attorney

K. LITTLEJOHN.
ODOMETER.
APPLICATION FILED MAY 23, 1911.

1,003,623.

Patented Sept. 19, 1911.

2 SHEETS—SHEET 2.

Witnesses
L. H. Schmidt
Jos. Darling

Inventor
KENDREE LITTLEJOHN,
By Edw. W. Byrn.
Attorney

UNITED STATES PATENT OFFICE.

KENDREE LITTLEJOHN, OF PACOLET, SOUTH CAROLINA.

ODOMETER.

1,003,623.

Specification of Letters Patent. Patented Sept. 19, 1911.

Application filed May 23, 1911. Serial No. 629,034.

*To all whom it may concern:*

Be it known that I, KENDREE LITTLEJOHN, a citizen of the United States, residing at Pacolet, in the county of Spartanburg and State of South Carolina, have invented certain new and useful Improvements in Odometers, of which the following is a specification.

My invention relates to that class of devices known as odometers, which are in the nature of instruments for measuring the distance traveled over a road, and which are generally in the form of appliances to be attached to the wheels of a vehicle to determine the number of revolutions. Such a device is a great desideratum, especially for the use of liverymen, who usually have no means of knowing the distance traveled by a hired team.

My invention consists in a simple and practical device of this character which is adapted to be fitted over the hub of the wheel to accurately register its revolutions, and which is universally applicable to all wheels and is quickly applied or removed, without involving any alteration of or injury to the wheel.

Figure 4:
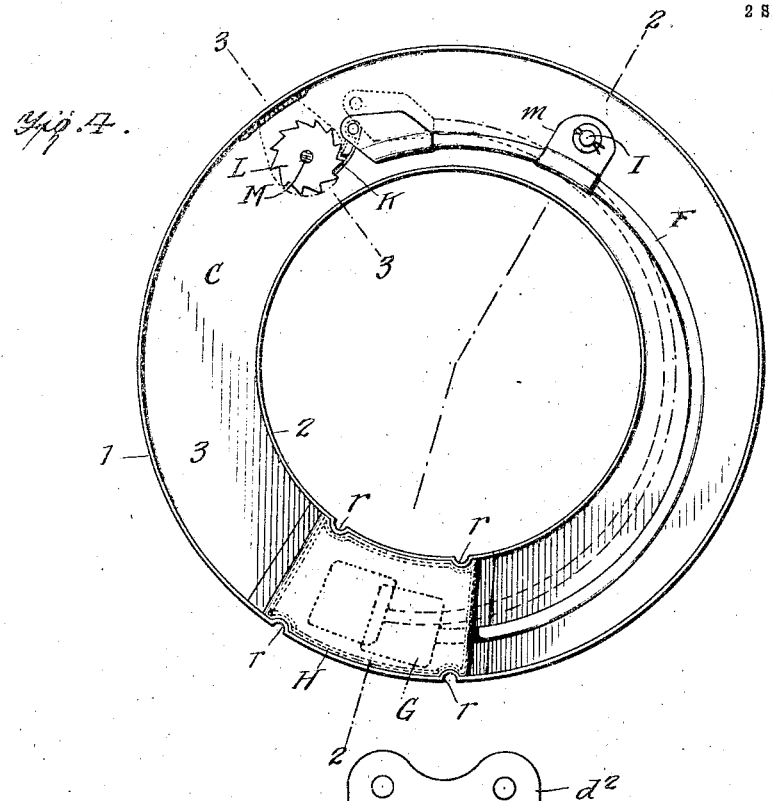
Figure 5:
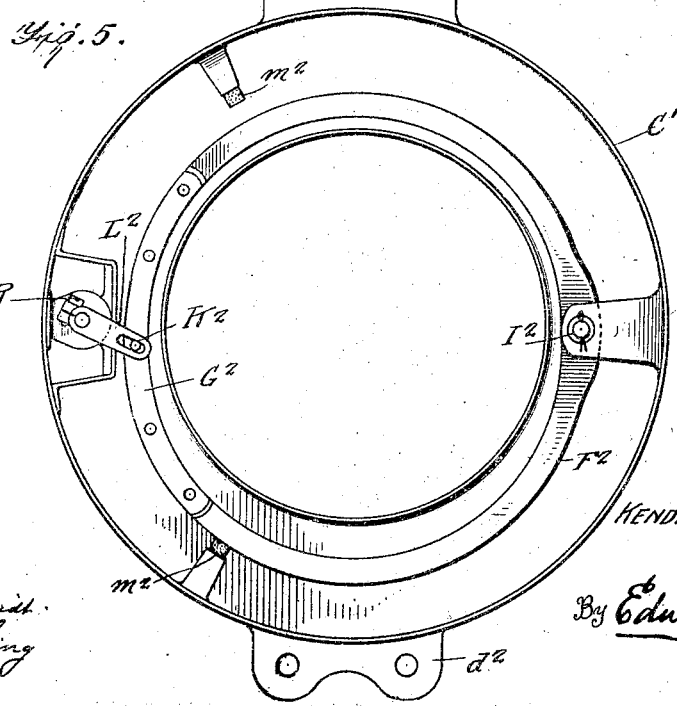

Figure 1. is an inside view of a wheel with my invention applied thereto. Fig. 2. is a transverse section of my odometer with a part of the spokes of the wheel removed. Fig. 3. is a transverse section through lines 3—3 of Fig. 4, showing the register in place. Fig. 4. is an inside view of the inner case section of the annular housing and, Fig. 5, is a similar view showing a modification.

In the drawings, Figs. 1, 2, 3, 4, A represents the spokes of a wheel, and B the hub, to which my invention is shown applied, inside the wheel, *i. e.* between the wheel and the body of the vehicle, where it is protected from external injury.

The case or housing of the odometer is of annular or ring-shaped form and embraces the hub so as to be concentric therewith. Said housing is made in two parts telescoped the one into the other. The inner section C, Figs. 2, 3, 4, consists of the outer flange 1, inner fl nge 3 and connecting wall 2. The outer section D consists of outer walls 4 and 5 at right angles to each other having on the outer periphery a marginal flange *d* provided with a series of perforations for bolts and an inner crimp or flange *e*. The inner section C is retained between the outer wall 4 and flange or crimp *e* of the outer section D and as it lies next to the spokes, as shown in Fig. 2, no other provision is required for holding it in place, as the outer section has its peripheral flange *d* lying flat against the spokes, parallel to the plane of the wheel, and is secured by bolts *a* extending between the spokes to an outer ring E lying on the outside of the wheel. The two sections of the housing form an annular casing that is applied to the hub concentrically with the same from the inside and they are made in sizes to suit the sizes of the various hubs to which they may be applied.

The outer flange 1 of the inner section C of the housing is at one point indented to receive a glass plate *f*, Fig. 3, and the outer wall of the outer section of the housing has an opening coinciding with the glass plate *f* the edges of which opening hold the glass plate in place in its indented seat when the parts of the case are telescoped together, as seen in Fig. 3. Just opposite this window is placed in the housing a registering device R, which may be a Veeder cyclometer, or any other form of registering device. The wheels of this register are operated by a shaft M, Figs. 3, and 4, which shaft has a rigidly attached ratchet wheel L which is intermittently operated upon at every revolution of the vehicle wheel by actuating devices, as follows: Within the annular housing is fulcrumed upon a pin I a circular curved lever F extending a little more than half around the casing, see Fig. 4. This lever F at one end bears a pawl K which, as the lever oscillates, in the revolutions of the wheel, engages and turns the ratchet wheel L one notch for each revolution of the vehicle wheel and consequently turns the register a corresponding space, a suitable detent being provided to prevent back motion. The other end of the curved lever at a point diametrically opposite its fulcrum bears a freely moving weight G which plays within a supplementary housing H in the annular housing. This supplementary housing H is cheaply and firmly held in place by crimps *r* in the inner and outer walls of this section of the housing and said supplementary housing is lined with a sound deadening lining *i*, which prevents the weight from chattering or making a rattling noise. To further hold the long curved lever steady against lateral play, the lever is connected to its fulcrum pin I by a pivot plate m and against this pivot plate is arranged to bear a spiral spring J, see Fig. 2, wound about the pin I and retained by a washer and cross pin.

As a modification of my invention; the circular lever F may be constructed as a complete circle, or ring F², as seen in Fig. 5, in which G² is the weight set diametrically opposite the fulcrum I² on the opposite side of the center of the curve of the lever. This circular lever is connected to the register R by a pin K² playing in the slot of a crank arm L² of the register. In such modification elastic cushion stops m² m² serve to limit the vibration of the lever. In either case, as the vehicle wheel turns over, the weight gravitates first in one direction and then in the other about its fulcrum and imparts the necessary movement to the registering devices by a strong and positive action.

In pointing out the merits of the circularly curved actuating lever having a fulcrum on one side of the center of the curve of the annular housing and its weight on the opposite side of the center, I would state that this causes the weight in the shifting movement to oscillate longitudinally in the annular housing, as shown in dotted lines in Fig. 4, in a curved path substantially corresponding to the curve of the annular housing which gives a long and strong impulse on the long end of the lever to positively and certainly actuate the register and thus permits a relatively narrow and unobtrusive annular casing.

I claim.

1. An odometer comprising an annular housing adapted to embrace the wheel hub, a registering device within the same and an actuating device for the register consisting of a circularly curved lever having a fulcrum within the annular housing and on one side of the center of the same, and an attached weight on the opposite side of said annular housing with respect to the center of the wheel hub, and means connecting said curved lever to the register.

2. An odometer comprising an annular housing adapted to embrace the wheel hub, a registering device within the same and an actuating device for the register consisting of a circularly curved lever having a fulcrum within the annular housing and on one side of the center of the same, and an attached weight on the opposite side of said annular housing with respect to the center of the hub, and means connecting said curved lever to the register, the curved lever being made of semicircular extent and having a supplementary housing within the annular housing to inclose the weight.

3. An odometer comprising an annular housing adapted to embrace the wheel hub, a registering device within the same and an actuating device for the register consisting of a circularly curved lever having a fulcrum within the annular housing and on one side of the center of the same, and an attached weight on the opposite side of said annular housing with respect to the center of the hub, means connecting said curved lever to the register, and a spring at the fulcrum of the lever to prevent rattling and lateral movement of the lever.

4. An odometer having an annular casing with registering devices, said casing consisting of an inner annular section having an inner and outer flange and connecting side wall and the outer section having a peripheral perforated flange extending parallel to the spokes of the wheel and an inner inturned flange, the inner section being contained within the outer section and adapted to be inclosed and retained between the outer section and the spokes, and an opposite clamping device for the peripheral flange of the housing adapted to fit on the other side of the spokes.

5. An odometer having an annular housing adapted to embrace the wheel hub, a register within the same, a semicircular weighted lever fulcrumed in the annular housing on one side of its center, means for connecting it to the register, a weight on the opposite end of the lever and in the opposite side of the annular housing with respect to the center of the hub, and a supplemental housing for the weight arranged within the annular housing and having a sound deadening lining.

6. An odometer having an annular housing adapted to embrace the wheel hub, a register within the same, a semicircular weighted lever fulcrumed within the annular housing, means for connecting it to the register, a weight on the end of the lever on the opposite side of the annular housing, and a supplemental housing for the weight, said latter housing being made detachable, and crimps for securing the supplemental housing within the annular housing.

7. An odometer having an annular housing adapted to embrace the wheel hub, a register within the same, a semicircular weighted lever, means for connecting it to the register, a weight on the opposite end of the lever and a fulcrum for the lever placed diametrically opposite the weight to cause the weight to move longitudinally in the housing in a curved line corresponding substantially to the curve of the annular housing and at right angles to the radial line of the hub.

8. An odometer, comprising an annular housing made in two telescoping sections adapted to slide laterally one over the other, said sections being formed with a peripheral opening having off-set edges forming a seat for a window pane, a transparent pane seated therein and secured by the telescoping of one housing section over the other, a register within the housing opposite said opening and a gravity actuated device for operating the register.

In testimony whereof I affix my signature in presence of two witnesses.

KENDREE LITTLEJOHN.

Witnesses:
 HUGH R. CANNON,
 E. W. MILLER.